(12) United States Patent
Silieti et al.

(10) Patent No.: US 8,863,365 B2
(45) Date of Patent: Oct. 21, 2014

(54) REMOVAL OF STUCK BLADE IN A TURBINE ENGINE

(75) Inventors: Mahmood K. Silieti, Orlando, FL (US); Jonathan M. Leagon, Cassatt, SC (US); Kenneth L. Moore, Pearland, TX (US); Robert D. Barker, Hobe Sound, FL (US)

(73) Assignee: Siemens Energy, Inc., Orlando, FL (US)

( * ) Notice: Subject to any disclaimer, the term of this patent is extended or adjusted under 35 U.S.C. 154(b) by 542 days.

(21) Appl. No.: 12/942,088

(22) Filed: Nov. 9, 2010

(65) Prior Publication Data

US 2011/0179645 A1 Jul. 28, 2011

Related U.S. Application Data

(60) Provisional application No. 61/297,393, filed on Jan. 22, 2010.

(51) Int. Cl.
| | |
|---|---|
| *B25B 27/02* | (2006.01) |
| *B23P 19/033* | (2006.01) |
| *F01D 25/28* | (2006.01) |
| *F01D 5/00* | (2006.01) |
| *B23P 19/02* | (2006.01) |

(52) U.S. Cl.
CPC .............. *F01D 5/005* (2013.01); *B23P 19/033* (2013.01); *F05D 2230/70* (2013.01); *F05D 2230/80* (2013.01); *F01D 25/285* (2013.01); *B23P 19/025* (2013.01)
USPC .............................................. 29/254; 29/255

(58) Field of Classification Search
CPC ...... B23P 19/00; B23P 19/022; B23P 19/025; B23P 19/027; B23P 2700/02
USPC ........................ 29/254, 252, 244, 270, 281.1; 269/289 R
See application file for complete search history.

(56) References Cited

U.S. PATENT DOCUMENTS

| | | | |
|---|---|---|---|
| 4,078,290 A | 3/1978 | Fletcher et al. | |
| RE29,802 E * | 10/1978 | Whitledge et al. | 29/237 |
| 4,455,730 A | 6/1984 | Guenther | |
| 4,805,282 A | 2/1989 | Reaves et al. | |
| 5,860,203 A * | 1/1999 | Gehr, Jr. | 29/252 |
| 6,375,423 B1 | 4/2002 | Roberts et al. | |
| 6,571,471 B2 | 6/2003 | Hohmann | |
| 6,572,448 B1 * | 6/2003 | Bauer | 451/29 |

(Continued)

FOREIGN PATENT DOCUMENTS

| | | |
|---|---|---|
| CN | 1729352 A | 7/2004 |
| CN | 1718362 A | 1/2006 |

(Continued)

*Primary Examiner* — Lee D Wilson

(57) ABSTRACT

An apparatus for dislodging stuck blades in a turbine engine. The apparatus includes a housing, cam structure, and impact structure. The housing is capable of being temporarily secured to a blade disc structure adjacent to a stuck blade to be dislodged. The cam structure is associated with the housing and is adapted to receive an input torque that rotates the cam structure, the cam structure capable of translating the input torque into an impact force, the impact force including a component in a desired direction. The impact structure is associated with the housing and is capable of receiving the impact force from the cam structure and exerting the impact force on a root area of the stuck blade for dislodging the stuck blade from the blade disc structure non-destructively.

20 Claims, 4 Drawing Sheets

(56) References Cited

U.S. PATENT DOCUMENTS

| | | | |
|---|---|---|---|
| 7,669,306 B2 * | 3/2010 | Palka | 29/261 |
| 8,250,721 B2 * | 8/2012 | Krawcheck et al. | 29/243.5 |
| 2009/0139071 A1 * | 6/2009 | Palka | 29/259 |
| 2011/0179645 A1 * | 7/2011 | Silieti et al. | 29/889.1 |

FOREIGN PATENT DOCUMENTS

| | | |
|---|---|---|
| EP | 1614856 A1 | 1/2006 |
| EP | 1955805 A1 | 8/2008 |
| JP | S61163177 U | 10/1986 |

\* cited by examiner

REMOVAL OF STUCK BLADE IN A TURBINE ENGINE

CROSS REFERENCE TO RELATED APPLICATIONS

This application claims the benefit of U.S. Patent Application Ser. No. 61/297,393, filed Jan. 22, 2010, entitled "IMPACT CAM-DRIVEN TOOL TO REMOVE STUCK COMPRESSOR BLADES NON-DESTRUCTIVELY," the entire disclosure of which is incorporated by reference herein.

FIELD OF THE INVENTION

The present invention relates to the non-destructive removal of a stuck blade, such as a compressor blade, in a turbine engine.

BACKGROUND OF THE INVENTION

A turbine engine includes a compressor section, a combustion section, and a turbine section. The compressor and turbine sections each include alternating rows of stationary vanes and rotating blades. Blades within the compressor and turbine sections may become stuck to a blade disc structure with which the blades are associated, which blade disc structure structurally supports the blades in the engine. In the event that such stuck blades are in need of being removed from the engine, e.g., for repair or replacement, measures are taken to remove each stuck blade without damaging the adjacent blades or the blade disc structure. Such measures are risky and include, for example, cutting each stuck blade out of the engine, which techniques are time consuming, very expensive, and difficult.

SUMMARY OF THE INVENTION

In accordance with one aspect of the invention, a method is provided for dislodging a stuck blade from a blade disc structure in a turbine engine. An input torque is imparted to a torque receiving structure coupled to a housing that is temporarily affixed to the blade disc structure adjacent to the stuck blade. The input torque received by the torque receiving structure is translated into an impact force, the impact force including a component in a desired direction. The impact force is exerted on a root area of the stuck blade to dislodge the stuck blade from the blade disc structure.

Imparting the input torque may comprise imparting a repetitious pneumatic input torque or a continuous input torque to the torque receiving structure.

The repetitious pneumatic input torque may be imparted with an impact gun about a radial axis.

The input torque may be imparted to a torque receiving structure at a location radially outwardly from the blade root area.

Translating the input torque may comprise rotating a translating structure having a portion including a non-circular cross section, wherein rotation of the translating structure portion thrusts an impact structure in contact with the translating structure portion toward the stuck blade.

The method may further comprise removing the dislodged blade from the blade disc structure by lifting the dislodged blade radially outwardly from the blade disc structure.

Before imparting the input torque, the housing may be assembled by moving the housing radially inwardly onto the blade disc structure such that the stuck blade is received in an opening formed in the housing.

Assembling the housing may further comprise temporarily securing the housing to the blade disc structure.

The root area of the stuck blade may be in contact with the blade disc structure such that there is substantially no clearance in a radial direction between the stuck blade and the blade disc structure.

The stuck blade may be arranged at a broach angle with respect to a longitudinal axis of the engine.

In accordance with a second aspect of the invention, an apparatus is provided for dislodging stuck blades in a turbine engine. The apparatus comprises a housing, torque receiving structure, translating structure, and impact structure. The housing is capable of being temporarily secured to a blade disc structure adjacent to a stuck blade to be dislodged. The torque receiving structure is associated with the housing and is adapted to receive an input torque that rotates the torque receiving structure. The translating structure is associated with the housing and is capable of receiving the input torque from the torque receiving structure and translating the input torque into an impact force, the impact force including a component in a desired direction. The impact structure is associated with the housing and is capable of receiving the impact force from the translating structure and exerting the impact force on a root area of the stuck blade for dislodging the stuck blade from the blade disc structure.

The housing may comprise an opening through which the stuck blade extends. The housing may further comprise mounting structure for temporarily securing the housing to the blade disc structure between adjacent blades.

The torque receiving structure may be located radially outwardly from the root area of the stuck blade.

The torque receiving structure may comprise a camshaft and the translating structure may comprise a cam lobe having a portion including a non-circular cross section.

At least a section of the cam lobe portion may comprise an oval cross section.

The impact structure may comprise a lifter, and rotation of the cam lobe portion may cause the lifter to move toward the root area of the stuck blade.

In accordance with a third aspect of the invention, an apparatus is provided for dislodging stuck blades in a turbine engine. The apparatus comprises a housing, cam structure, and impact structure. The housing is capable of being temporarily secured to a blade disc structure adjacent to a stuck blade to be dislodged. The cam structure is associated with the housing and is adapted to receive an input torque that rotates the cam structure, the cam structure capable of translating the input torque into an impact force, the impact force including a component in an axial direction. The impact structure is associated with the housing and is capable of receiving the impact force from the cam structure and exerting the impact force on a root area of the stuck blade for dislodging the stuck blade from the blade disc structure.

The cam structure may comprise a camshaft adapted to receive the input torque and a cam lobe capable of translating the input torque into the impact force. The camshaft may be integrally formed with the cam lobe.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
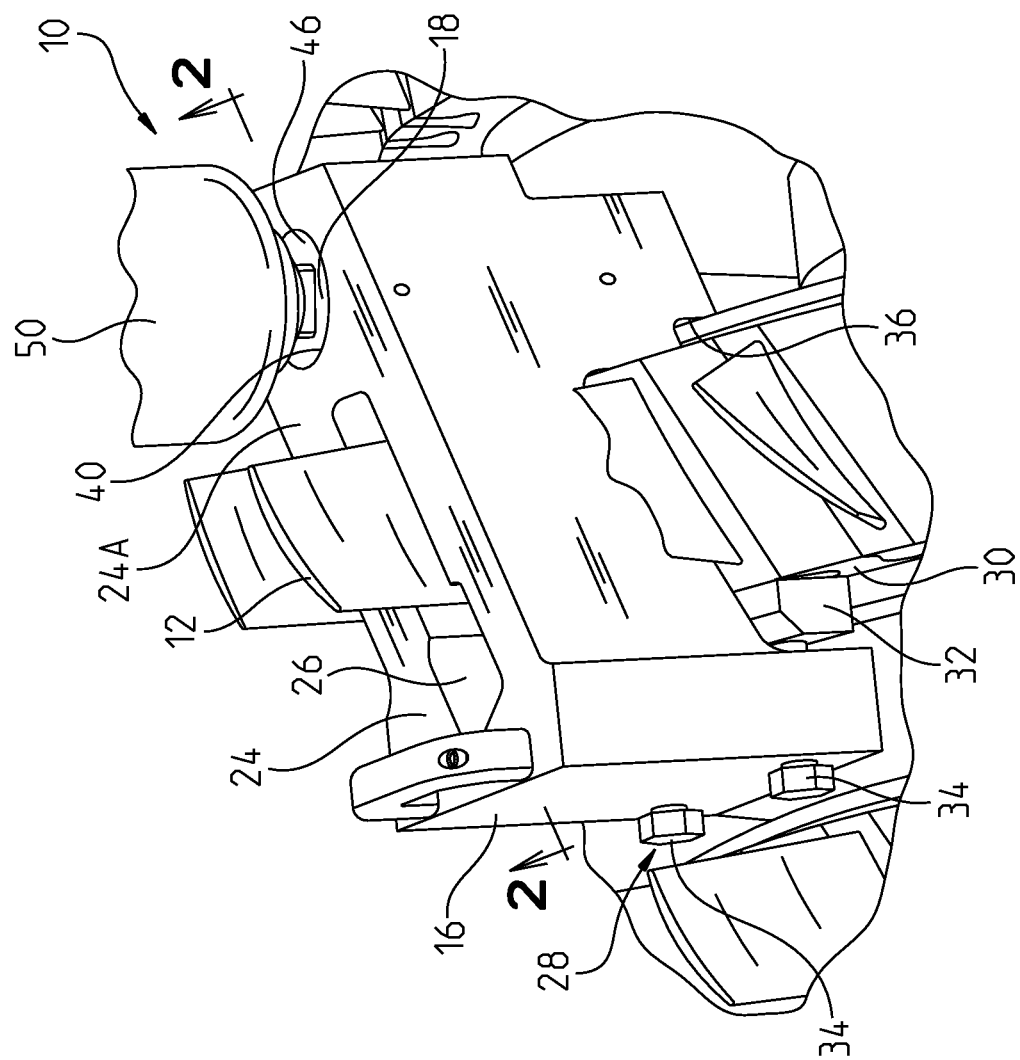
FIG. 1 is a perspective view of an apparatus for dislodging stuck blades in a turbine engine according to an embodiment of the invention.
Figure 2:
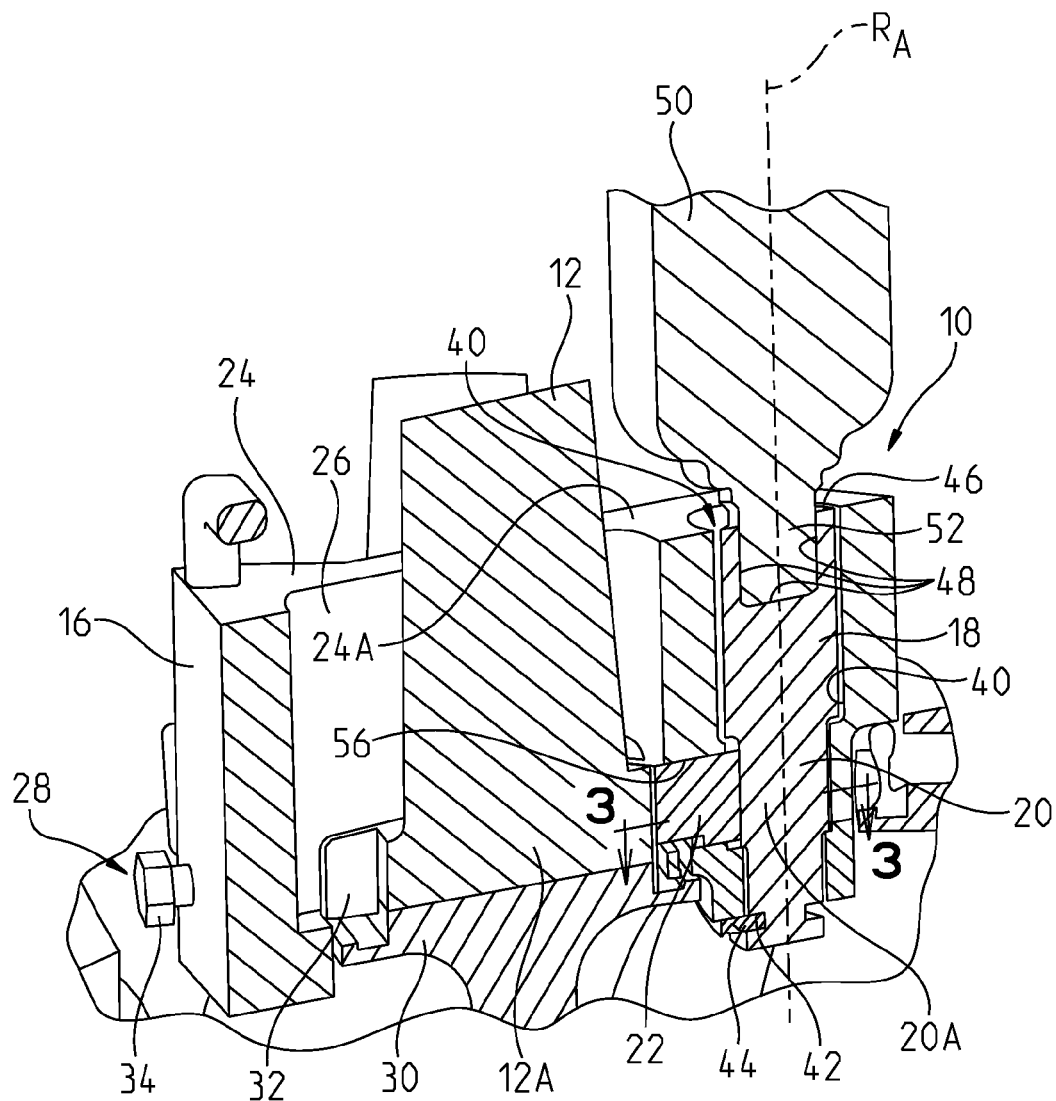
FIG. 2 is a view taken on the plane indicated by the line 2-2 in FIG. 1.

Referring to FIGS. 1 and 2, an apparatus 10 for dislodging stuck blades 12 in a turbine engine is illustrated. The blades 12 illustrated in FIG. 1 are compressor blades but the apparatus 10 could also be used to dislodge stuck turbine blades. The apparatus 10 comprises a housing 16, torque receiving structure 18, translating structure 20 (FIG. 2), and impact structure 22 (FIG. 2), each of which will be discussed in detail herein. In the embodiment shown, the torque receiving structure 18 and the translating structure 20 are formed as an integral unit, although it is understood that these components could be separately formed and joined together without departing from the spirit and scope of the invention. The integral unit will hereinafter be referred to as a "torque unit 18/20".

The housing 16 comprises a main body 24 that includes an opening 26 that extends all the way through the main body 24. The opening 26 receives the stuck blade 12 to be removed, as shown in FIGS. 1 and 2. More specifically, an airfoil portion of the blade 12 is received in the opening 26. The opening 26 may define an elongate slot such that the walls of the blade 12 come in close proximity to the walls of the main body 24 that define the opening 26. The main body 24 is preferably sized such that it is capable of being inserted between adjacent blades 12 to either side of the stuck blade 12 without damaging the adjacent blades 12. The main body 24 is also preferably sized such that it is capable of being inserted between adjacent rows of blades 12 to either side of the row including the stuck blade 12, as shown in FIG. 1.

The housing 16 also includes mounting structure 28 that is used to temporarily secure the housing 16 to a blade disc structure 30 with which the stuck blade 12 is associated, i.e., a root area 12A of the stuck blade 12 is mounted to the blade disc structure 30. In the embodiment shown, the mounting structure 28 comprises a clamping member 32 that is movable toward and away from the blade disc structure 30 by rotation of a pair of bolts 34 that are inserted through and threadedly engage the main body 24 and are coupled to the clamping member 32. Rotation of the bolts 34 in a first direction causes the clamping member 32 to move toward the blade disc structure 30. Continued rotation of the bolts 34 in the first direction causes the blade disc structure 30 to become lodged between the clamping member 32 and a surface 36 of the main body 24 to temporarily secure the housing 16 to the blade disc structure 30. Once the stuck blade 12 is removed, as will be discussed herein, rotation of the bolts 34 in a second direction opposite to the first direction causes the clamping member 32 to disengage from the blade disc structure 30 such that the apparatus 10 can be removed.

The main body 24 further includes a stepped bore 40 that extends through the main body 24 adjacent to the opening 26. The bore 40 receives the torque unit 18/20 therein. A groove 42 of the torque unit 18/20 is supported via a retainer plate 44 that is bolted to the bottom of the housing 16 to secure the torque unit 18/20 within the bore 40, see FIG. 2. The torque unit 18/20 is able to rotate within the bore 40, as will be described herein.

The torque receiving structure 18 in the embodiment shown comprises a cam shaft that includes a first end 46, which first end 46 is exposed through the bore 40 at an outer end 24A of the main body 24, as shown in FIGS. 1 and 2. The first end 46 includes an engagement portion 48 that is adapted to be engaged by a torque generating device 50, see FIG. 2. The engagement portion 48 in the embodiment shown comprises a shaped indentation that is adapted to be engaged by a correspondingly shaped extension member 52 of the torque generating device 50, although other types of engagement between the torque receiving structure 18 and the torque generating device 50 may be used. It is also contemplated that the torque receiving structure 18 or the entire torque unit 18/20 could be integrally formed with the torque generating device 50. The torque generating device 50 preferably comprises an impact gun, otherwise referred to as an impact wrench, or similar structure, but may comprise other types of torque generating devices, such as, for example, a torque wrench or a torque ratchet. As illustrated in FIG. 2, the torque receiving structure 18, most notably the first end 46 thereof, is located radially outwardly from the root area 12A of the stuck blade 12.

Figure 3:
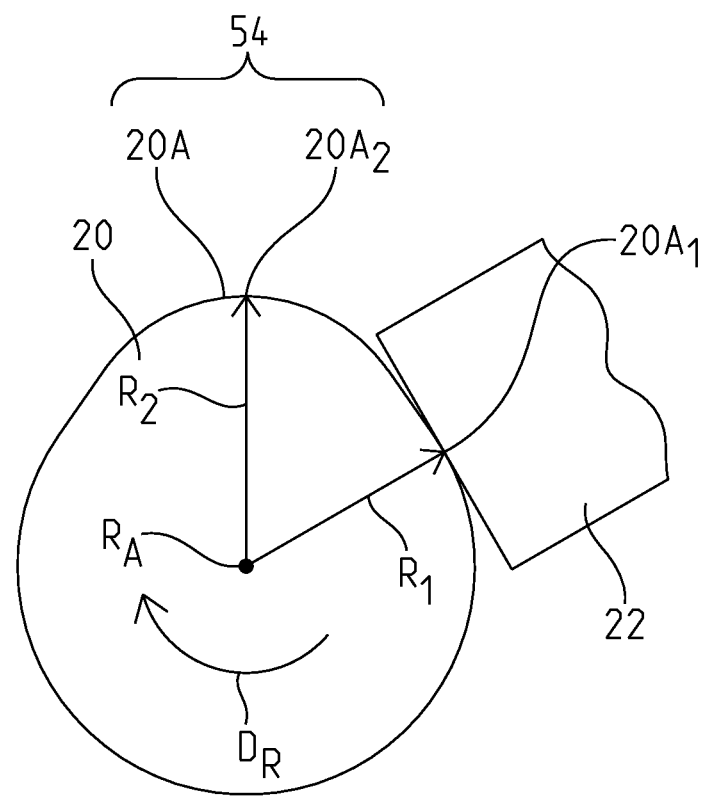
FIG. 3 is a view taken on the plane indicated by the line 3-3 in FIG. 2.

The translating structure 20 in the embodiment shown comprises an eccentric cam lobe, a portion 20A of which has a non-circular cross section, see FIG. 3. In one embodiment, the cam lobe portion 20A has a section 54 having an oval cross section, but the cam lobe could have other non-circular cross sections without departing from the spirit and scope of the invention.

As illustrated in FIG. 2, the impact structure 22 is located adjacent to the cam lobe portion 20A having the non-circular cross section. In the embodiment shown, the impact structure 22 comprises a lifter, also referred to as a lifter/follower. The impact structure 22 is slidably received in an aperture 56, formed in the main body 24, the aperture 56 including a component in an axial direction of the engine, see FIG. 2. The aperture 56 communicates with the opening 26 that receives the stuck blade 12 and also with the bore 40 that receives the torque unit 18/20 such that the impact structure 22 is cable of contacting the stuck blade 12 and the translating structure 20.

The impact structure 22 is not coupled to the translating structure 20, but rather is adapted to be contacted by and receive a blade dislodging force from the translating structure 20. Specifically, rotation of the translating structure 20 causes contact between the cam lobe portion 20A and the impact structure 22 to cause movement of the impact structure 22 toward the root area 12A of the stuck blade 12. More particularly, referring to FIG. 3, as the translating structure 20 rotates in a direction $D_R$ about a radial axis $R_A$ (see also FIG. 2), a first contact surface $20A_1$ of the translating structure 20 having a first radius $R_1$ rotates so as to move out of contact with the impact structure 22. As the translating structure continues to rotate about the radial axis $R_A$, a second contact surface $20A_2$ of the translating structure 20 having a second radius $R_2$ greater than the first radius $R_1$ rotates so as to gradually move into contact with and apply a force to the impact structure 22.

Since the second radius $R_2$ of the second contact surface $20A_2$ is greater than the first radius $R_1$ of the first contact surface $20A_1$, the impact structure 22 is moved further from the radial axis $R_A$, i.e., toward and against the root area 12A of the stuck blade 12. It is noted that, in the embodiment shown, additional contact surfaces are defined between the first and second contact surfaces $20A_1$ and $20A_2$. These additional contact surfaces have increasing radii from the first contact surface $20A_1$ to the second contact surface $20A_2$ to move the impact structure 22 gradually farther away from the radial axis $R_A$. It is also noted that a smooth or a stepped transition between the first and second contact surfaces $20A_1$ and $20A_2$ may be defined by the additional contact surfaces.

Figure 4:
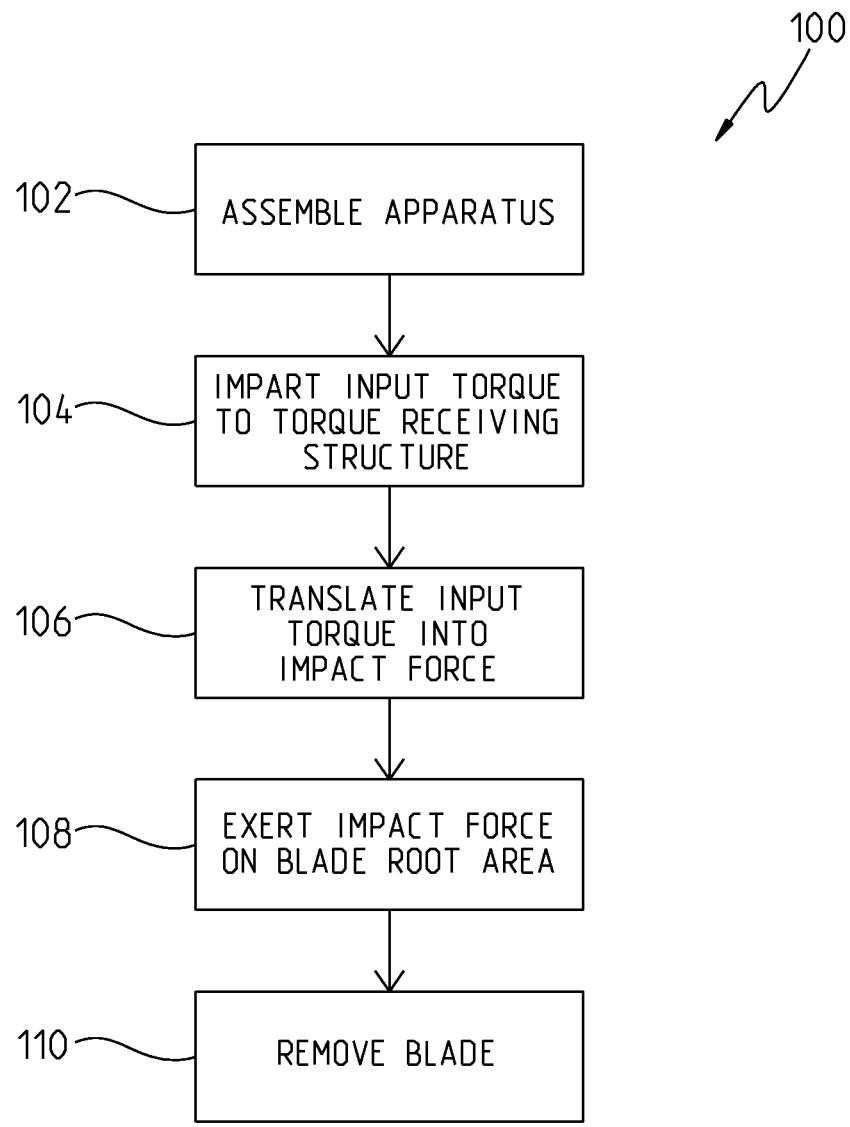
FIG. 4 is a flow chart illustrating exemplary steps for dislodging a stuck blade in a turbine engine according to an embodiment of the invention.

Referring to FIG. 4, a method 100 for dislodging a stuck blade in a turbine engine is shown. The blade to be dislodged may be the blade 12 discussed above with reference to FIGS. 1 and 2.

The apparatus 10 is assembled for use at step 102. During the assembly, the housing 16 is moved radially inwardly onto the blade disc structure 30 such that the stuck blade 12 is received in the opening 26 formed in the main body 24. The housing 16 is then temporarily secured to the blade disc structure 30 using the mounting structure 28, as described above. Due to the size and shape of the housing 16, and since the torque is imparted to the torque receiving structure 18 radially outwardly from the root area 12A of the stuck blade 12, the apparatus 10 is capable of being used in tight and generally confined spaces between adjacent blades 12 and between adjacent rows of blades 12. Further, the apparatus 10 may be used to remove blades 12 that extend in a generally axial direction, i.e., the blades 12 have suction and pressure sidewalls generally parallel with the axial direction, in addition to blades 12 that extend at a broach (non-axial) angle. It is noted that the apparatus 10 may be selected to correspond to the configuration of the blade 12 to be removed and/or the blade disc structure 30 associated with the blade 12 to be removed.

Once the apparatus 10 is assembled at step 102, an input torque is imparted to the torque receiving structure 18 using the torque generating device 50 at step 104. According to one embodiment, imparting the input torque may be performed with an impact gun that imparts to the torque receiving structure 18 a repetitious pneumatic input torque about the radial axis $R_A$. According to another embodiment, imparting the input torque may be performed with a torque wrench or torque ratchet that imparts to the torque receiving structure 18 a continuous input torque about the radial axis $R_A$. As noted above, the torque is imparted by the torque generating device 50 to the torque receiving structure 18 at a location radially outwardly from the root area 12A of the stuck blade 12. This feature allows the apparatus 10 to be capable of removing stuck blades in confined spaces between blades 12 and rows of blades 12, as noted above. The input torque imparted on the torque receiving structure 18 causes rotation of the torque receiving structure 18 about the radial axis $R_A$. It is noted that the input torque may gradually increase to increase the magnitude of the resulting impact force, which impact force will be described herein. In one exemplary embodiment, the input torque may commence with a pneumatic line pressure of about 30 pounds per square inch (psi), which may deliver about 24,000 pounds of impact force, and end with a pneumatic line pressure of about 90 psi, which may deliver about 52,000 pounds of impact force.

The input torque imparted to the torque receiving structure 18 is translated into an impact force including a component in a desired direction, e.g., an axial direction, at step 106. In one embodiment, the input torque is translated into an impact force with translating structure 20 that is integral with the torque receiving structure 18. More particularly, the rotation of the torque receiving structure 18 causes corresponding rotation of the translating structure 20, which translating structure 20 comprises a portion 20A having a non-circular cross section, as discussed above. The rotation of the portion 20A of the translating structure 20 creates an impact force in the desired direction due to the increasing radii of the contact surfaces as the translating structure 20 is rotated about the axis $R_A$, as discussed in detail above.

If the input torque is a repetitious pneumatic input torque, e.g., imparted with an impact gun, the impact force comprises a repetitious "hammering" impact force. If the input torque is a continuous input torque, e.g., imparted with a torque wrench or torque ratchet, the impact force comprises a continuous, steady impact force.

At step 108, the impact force is exerted on the root area 12A of the stuck blade 12 to dislodge the stuck blade 12 from the blade disc structure 30. More particularly, in the embodiment shown, the impact force discussed above at step 106 is conveyed to the impact structure 22 so as to thrust the impact structure 22 toward and into contact with the root area 12A of the stuck blade 12. This striking contact between the impact structure 22 and the stuck blade 12, which may be repetitious hammering contact, or continuous steady contact, as discussed above, dislodges the stuck blade 12 from the blade disc structure 30. Vibrations resulting from the hammering contact further assist in dislodging the stuck blade 12 from the blade disc structure 30.

At step 110, the blade 12 is removed from the blade disc structure 30 by lifting the blade 12 out of the opening 26 in the housing 24. The apparatus 10 can then be disassembled and removed from the blade disc structure 30.

The non-destructive dislodging and removal of stuck turbine blades 12 described herein is believed to significantly reduce the cost, time, and complexity of removing stuck blades 12 from a turbine engine. Further, the stuck blades 12 can be dislodged/removed without damaging the adjacent blades 12 or the blade disc structure 30 associated with the stuck blade 12. Moreover, the stuck blades 12 can be dislodged/removed from the blade disc structure 30 even when the root area 12A of the blade 12 is in contact with the blade disc structure 30, such that there is substantially no clearance in the radial direction between the stuck blade 12 and the blade disc structure 30.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for dislodging a stuck blade from a blade disc structure in a turbine engine comprising:
    imparting an input torque to a torque receiving structure coupled to a housing that is temporarily affixed to the blade disc structure adjacent to the stuck blade;
    translating the input torque received by the torque receiving structure into an impact force comprising rotating a translating structure having a portion including a non-circular cross section, the impact force including a component in a desired direction and being effected by rotation of the portion of the translating structure including a non-circular cross section; and
    exerting the impact force on a root area of the stuck blade to dislodge the stuck blade from the blade disc structure.

2. The method of claim 1, wherein imparting an input torque comprises imparting a repetitious pneumatic input torque to the torque receiving structure about a radial axis of an apparatus used for dislodging the stuck blade from the blade disc structure.

3. The method of claim 1, wherein imparting an input torque comprises imparting a continuous input torque to the torque receiving structure about a radial axis of an apparatus used for dislodging the stuck blade from the blade disc structure.

4. The method of claim 1, wherein rotation of the translating structure portion thrusts an impact structure in contact with the translating structure portion in a direction toward the stuck blade, the direction being transverse to a radial axis of an apparatus used for dislodging the stuck blade from the blade disc structure.

5. The method of claim 1, further comprising removing the dislodged blade from the blade disc structure by lifting the dislodged blade radially outwardly from the blade disc structure.

6. The method of claim 1, further comprising, before imparting the input torque, assembling the housing by:
moving the housing radially inwardly onto the blade disc structure such that the stuck blade is received in an opening formed in the housing; and
temporarily securing the housing to the blade disc structure.

7. The method of claim 1, wherein exerting the impact force on a root area of the stuck blade comprises exerting the impact force on a root area of the stuck blade, wherein the root area of the stuck blade is in contact with the blade disc structure such that there is substantially no clearance in a radial direction between the stuck blade and the blade disc structure.

8. The method of claim 1, wherein exerting the impact force on a root area of the stuck blade comprises exerting the impact force on a root area of the stuck blade, wherein the stuck blade is arranged at a broach angle with respect to a longitudinal axis of the engine.

9. An apparatus for dislodging stuck blades in a turbine engine comprising:
a housing capable of being temporarily secured to a blade disc structure adjacent to a stuck blade to be dislodged;
torque receiving structure associated with said housing adapted to receive an input torque that rotates said torque receiving structure;
translating structure associated with said housing capable of receiving the input torque from said torque receiving structure and translating the input torque into an impact force, the impact force including a component in a desired direction, wherein said translating structure includes a portion including a non-circular cross section; and
impact structure associated with said housing capable of receiving said impact force from said portion of said translating structure including a non-circular cross section and exerting said impact force on a root area of said stuck blade for dislodging said stuck blade from said blade disc structure.

10. The apparatus of claim 9, wherein said housing comprises:
an opening through which said stuck blade extends; and
mounting structure for temporarily securing said housing to said blade disc structure between adjacent blades.

11. The apparatus of claim 9, wherein said torque receiving structure is located radially outwardly from said root area of said stuck blade.

12. The apparatus of claim 9, wherein said torque receiving structure comprises a cam shaft and said portion of said translating structure including a non-circular cross section comprises a cam lobe.

13. The apparatus of claim 9, wherein at least a section of said translating structure comprises an oval cross section effecting said portion of said translating structure including a non-circular cross section.

14. The apparatus of claim 9, wherein rotation of said translating structure about a radial axis of the apparatus causes said impact structure to move in a direction toward said root area of said stuck blade, the direction being transverse to the radial axis of the apparatus.

15. An apparatus for dislodging stuck blades in a turbine engine comprising:
a housing capable of being temporarily secured to a blade disc structure adjacent to a stuck blade to be dislodged;
cam structure associated with said housing and adapted to receive an input torque that rotates said cam structure, said cam structure capable of translating the input torque into an impact force, the impact force including a component in a direction transverse to a radial axis of the apparatus, wherein said cam structure includes a portion including a non-circular cross section; and
impact structure associated with said housing capable of receiving said impact force from said portion of said cam structure including a non-circular cross section and exerting said impact force on a root area of said stuck blade for dislodging said stuck blade from said blade disc structure.

16. The apparatus of claim 15, wherein said cam structure comprises:
a shaft adapted to receive the input torque; and
a component capable of translating the input torque into the impact force, wherein said component comprises the portion of said cam structure that includes a non-circular cross section.

17. The apparatus of claim 9, wherein said stuck blade extends radially from said blade disc structure.

18. The apparatus of claim 9, wherein the desired direction is transverse to a radial axis of the apparatus, about which said translating structure is rotated.

19. The apparatus of claim 9, wherein the desired direction is generally perpendicular to a radial axis of the apparatus, about which said translating structure is rotated.

20. The apparatus of claim 16, wherein said shaft comprises a cam shaft and said component comprises a cam lobe, and wherein said cam shaft is integrally formed with said cam lobe.

* * * * *